United States Patent
Bole et al.

(10) Patent No.: US 10,853,316 B1
(45) Date of Patent: Dec. 1, 2020

(54) FILE VERSIONING FOR CONTENT STORED IN A CLOUD COMPUTING ENVIRONMENT

(71) Applicant: Amazon Technologies, Inc., Reno, NV (US)

(72) Inventors: Arjun Bole, Seattle, WA (US); Shadie Hijazi, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 468 days.

(21) Appl. No.: 15/799,668

(22) Filed: Oct. 31, 2017

(51) Int. Cl.
G06F 16/14 (2019.01)
G06F 16/18 (2019.01)
G06F 16/16 (2019.01)
G06F 16/182 (2019.01)

(52) U.S. Cl.
CPC ........ G06F 16/152 (2019.01); G06F 16/1873 (2019.01); *G06F 16/164* (2019.01); *G06F 16/182* (2019.01)

(58) Field of Classification Search
CPC .............................. G06F 16/1873; G06F 16/152
See application file for complete search history.

(56) References Cited

U.S. PATENT DOCUMENTS

| | | | |
|---|---|---|---|
| 5,974,427 A * | 10/1999 | Reiter | G06F 16/2329 |
| 9,600,683 B1 * | 3/2017 | Whaley | G06F 16/2329 |
| 9,678,968 B1 * | 6/2017 | Taylor | G06F 3/0608 |
| 2008/0256138 A1 * | 10/2008 | Sim-Tang | G06F 16/128 |
| 2011/0066668 A1 * | 3/2011 | Guarraci | G06F 16/27 707/831 |
| 2013/0091188 A1 * | 4/2013 | Du | G06F 16/182 707/827 |
| 2013/0226876 A1 * | 8/2013 | Gati | G06F 16/119 707/652 |
| 2014/0006443 A1 * | 1/2014 | De Figueiredo Boneti | G06F 16/2455 707/769 |
| 2014/0279846 A1 * | 9/2014 | Srinivasan | G06F 16/93 707/608 |
| 2015/0205823 A1 * | 7/2015 | Rundle | G06F 16/1873 707/695 |
| 2017/0006129 A1 * | 1/2017 | Raja | G06F 16/2255 |
| 2017/0091208 A1 * | 3/2017 | Quan | G06F 3/0482 |

\* cited by examiner

*Primary Examiner* — Charles E Lu
(74) *Attorney, Agent, or Firm* — Hogan Lovells US LLP

(57) ABSTRACT

Embodiments of the present invention provide systems and methods for storing, accessing, and/or promoting previous versions of changed or overwritten content in a cloud computing or multitenant environment. According to various embodiments, the system may list all the versions, promote a version to be the current version of the node, delete a specific version of the node, and/or rename/move all the node versions. Metadata associated with file versioning may be stored in a dynamic table with concatenated identifiers as a hash key and a content version as another hash key. Accordingly, the method may include securely storing a copy of an object handle instead of copying the entire content at a new location, which reduces storage and resource requirements, as well as improve on security and performance by efficient lookups in the table for read, writes, updates, and deletes for the given node version.

20 Claims, 11 Drawing Sheets

FILE VERSIONING FOR CONTENT STORED IN A CLOUD COMPUTING ENVIRONMENT

BACKGROUND

Users are increasingly turning to network resources, such as remote servers executing "in the cloud," to perform various tasks, such as to store data, process programs, and share information with multiple users and terminals across the world. While early versions of cloud computing included services such as web-based email, such as Hotmail or Gmail, cloud computing has since evolved into cloud based storage and manipulation of documents, photos, movies, and computer programs. These cloud based services can serve minimally as a backup, or more ambitiously as a replacement for traditional desktop computing. As cloud-based computing services continue to evolve and provide enhanced processing power, greater storage, faster networks, and ubiquitous access to one's data, the utility to human beings likewise increases.

An advantage to obtaining content across a network is that a customer can access, edit, and update content from any device connected to the Internet or other network because the content is not stored locally to any one device, but on the cloud. Thus, as long as a user has a device to access the cloud and has the appropriate permissions, the user may view and/or edit content on the cloud that may have been previously created or edited on another device. Similarly, another user that has access to connect to the cloud and the appropriate permissions may also view and/or edit content that was created by another user. However, because content may be accessed, edited, created, and/or deleted from a multitude of devices, users, and locations, cloud computing introduces problems associated with keeping track of versions of the content.

BRIEF DESCRIPTION OF THE DRAWINGS

Various embodiments in accordance with the present disclosure will be described with reference to the drawings, in which.

DETAILED DESCRIPTION

Figure 1:
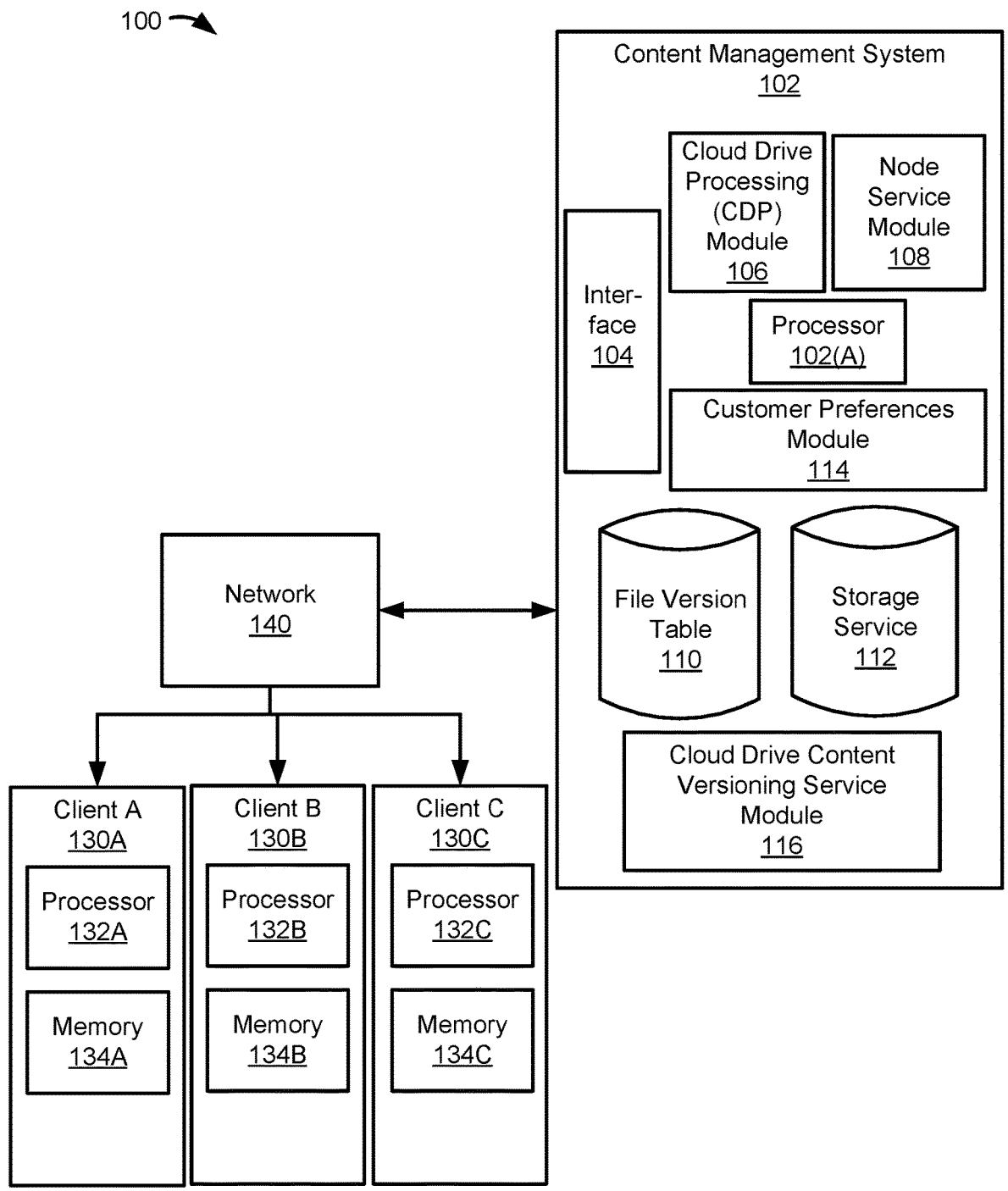
FIG. 1 illustrates an example system supporting file versioning in a cloud computing environment in accordance with one embodiment.

Systems and methods in accordance with various embodiments of the present disclosure may overcome one or more of the aforementioned and other deficiencies experienced in conventional approaches to managing content stored on a cloud computing environment. Embodiments of the present disclosure provide improved techniques to support multiple versions of content in the cloud without overloading storage resources by storing multiple copies. Instead, embodiments of the present disclosure implement an efficient versioning data table that stores relevant metadata, such information about the customer, the content, version, and/or storage location, in a secure and resource-conserving manner.

Advantages of using a cloud computing system and service include improved accessibility to customers across different devices and different locations. Additionally, customers who have the proper permissions can access the cloud and may share the same content with other customers. However, with the accessibility of cloud computing across different devices, locations, and users, content versioning becomes a problem. Maintaining historical records of different versions of content can burden storage and processing resources. Furthermore, existing cloud computing systems and services lack a customer interface where customers have the ability to view, download, or promote previous versions of a file they have stored with the cloud computing system. As such, embodiments of the present invention provide improved techniques of managing content versions in a cloud computing environment that reduce storage and processing resources while providing customers with transparency and control in managing their content stored on the cloud.

Embodiments of the present invention include a content management system enabled to provide a file version setting that can be enabled or disabled. The content management system may be a cloud computing system, a multi-tenant environment, and/or any other suitable computing environment that stores, accesses, and provides content. The setting may be set by a customer who owns or created the content and then applied as permissions for other customers in accessing the content. For example, a customer creating content but sharing the content may turn off file versioning for that content to prevent other users sharing the content from editing it such that only the customer originating the content can update or provide new versions of the content. In another embodiment, the file version setting may be applied based on the content type. For example, file versioning may be turned on for documents, but turned off for video files.

Additionally, the content management system may be able to provide a list of the versions of content and/or record a number of versions of the same content. For example, the content management system may store a maximum of five versions per document. The number of versions of content recorded and stored may be based on the content type (e.g., text, audio, video, etc.). In some embodiments, the content management system may store and record versions of content for a set period of time. The period of time may be set by the customer and/or be dependent on the content type. For example, the content management system may save text document versions forever, but only retain multiple versions of video content for 30 days.

According to various embodiments, the content management system may be enabled to upload new versions of content while maintaining a historical record of content versions. This historical record of content versions may be viewable to the customer, such that the customer may download specific versions of the content. The customer may also be enabled to promote a specific version of the content as the current version of the content. Other embodiments also provide customers with the ability to delete specific historical versions of the content, and/or move all versions of the content with the current version of the content are moved to a different storage location.

FIG. 1 illustrates an example overview block diagram of system 100 for storing and managing content in accordance with an embodiment. The system 100 may include a cloud computing system or content management system 102 that is connected to a network 140, such as the Internet or any other telecommunications or communications network. The network 140 can be any network to which devices, systems, servers, computers, etc. can connect to in order to communicate with each other. In another embodiment, the content management system 102 may be separate from a cloud computing system. Multiple customers of the cloud computing service may also be connected to the content management service 102. Customers may operate one or more devices through which they can access the content management system 102 and/or cloud computing service. For example, customers may be associated with computing devices such as Client A 130A, Client B 130B, and Client C 130C, may be connected to the network 140. Each client computing device 130A, 130B, and 130C may have a corresponding processor 132A, 132B, 132C and a memory 134A, 134B, 134C, on which each corresponding client computing device may be enabled to create, store, edit, transmit, and receive content.

According to various embodiments of the invention, the content management system 102 may interface with the network 140 through an interface 104, for example including but not limited to an application programming interface (API). In some embodiments, the interface 104 may be in communication with an external cloud computing system and service associated with the plurality of customers with client computing devices 130A, 130B, and 130C. The interface 104 may be enabled to process requests from customers transmitted by client computing devices 130C, 130B, and 130C and to transmit responses back to the customers. The content management system 102 may include a processor 102(A) and a memory with executable instructions that perform specific functions. For example, the content management system 102 may include a cloud drive processing (CDP) module 106 that is configured with executable code to process the requests/responses through the interface 104 with other modules, such as the node service module 108, customer preferences module 114, or cloud drive content versioning service module 116. The node service module 108 may be operatively coupled to the file version table 110 where nodes are created and stored in the file version table 110 to include various metadata, such as a customer identifier, node identifier, version, and storage information within storage service 112.

The content management system 102 may also include a customer preferences module 112 that implements a table storing cloud drive preferences for identified customers that can be looked up using a customer identifier. The customer preferences module 112 may be operatively coupled to the storage service 112 in order to determine the storage location of content associated with a particular customer. Additionally, a cloud drive content versioning service module 116 may be coupled to the customer preferences module 114, file version table 110, and/or storage service 112 to manage versions of content stored in storage service 112 and referenced by the file version table 110. In some embodiments, the content management system 102 may include the cloud computing system and service, for example including the storage service 112, CDP module 106, node service module 108, file version table 110, customer preferences module 114, and/or cloud drive content versioning service module 116. In other embodiments, the storage service 112, CDP module 106, node service module 108, file version table 110, and/or customer preferences module 114 may be operated by a cloud computing service and system, or individual external entities separate from the content management system 102. The storage service 112 may store versions of content in locations sorted by buckets, which may be based on the type of the content, for example. The storage service 112 may also generate and manage sets of storage keys used to authenticate versions of content and their respective storage locations.

To facilitate content versioning, according the various embodiments, the content management system may implement a file version table stored in 110 of FIG. 1 that stores metadata associated with content versions of a node. A node may be any electronic content stored in a cloud computing environment and managed by a content management system; for example, a node may be an electronic document, an audio file, a video file, an image file, or any other file in a digital format. The node may include various metadata associated with the electronic content. For example, Table 1 "File Version Table" illustrates an example file version table according to various embodiments. The file version table may include various fields for storing metadata, including a customer identifier, a node identifier, content versions, content file name, etc. The file version table may be designed such that the content management system may perform lookups in the file version table to execute functions on the content, for example, creates, reads, updates, and deletes for a given content or node version. The file version table may have an ability to sort query results based on the range key to support listing the various versions of a node.

To avoid copying large files of electronic content as a means of managing different versions, the content management system may store a copy of an object handle associated with a storage location of the copy. However, cloud computing also introduces the problem of potentially and inadvertently deleting a relevant version of content by referencing an older or irrelevant version of the content for deletion. Embodiments of the present invention resolve this problem by creating a content version table (see Table 2 "Content Version cns-v GSI") including a global secondary index (GSI) with a concatenated customer identifier (e.g., customerId), node identifier (e.g., nodeId), and a SHA256 hash of the storage information as the hash key. In some embodiments, the GSI may also include a range key indicating the content version. As such, the content management system may query the GSI before initiating any content deletion requests. In various embodiments, the content management system may also implement a personal preferences table (see Table 3 "Personal Preferences") including data associated with the customers connected to the cloud computing environment and/or the content management system. A customer's personal content management preferences may be looked up to determine the content versioning settings for content uploaded, accessed, and/or downloaded by that particular customer.

TABLE 1

File Version Table

| Field-Name | Type | Description | Example Value |
|---|---|---|---|
| cn | Hash key | Concatenated customerId:nodeId | AB12342387:ufhhabfhgbb_hhfgw |
| v | Range key | Content version | 2 |
| cd | Number | Stores the created time for this version in ISO8601 | 2007-03-01T13:00:00Z |
| cb | String | Stores the appFriendlyName of the application that created this version | CloudDriveWeb |
| cp | JSON | Stores the content properties for the current version in JSON format | |
| at | String set | Stores the list of assetIds related with the node | [Mvvw2KCmQNqR8Xf50sQtGg, Gvvw2KCmQNqR8Xf50sQtGm] |
| cati | String set | Stores the child asset type info, specifying if the type of asset is LIVE_VIDEO, SLOW_MO, etc. | LIVE_VIDEO |
| s3b | String | Stores the s3 bucket | cd-na-prod-content |
| s3k | String | Stores the s3 key | 21GRZH0F7G180TGZE0LH-DKLLMPLPTKR5JRZBI0MA-SPKDODP7YA |
| cns | String | Stores the concatenated customerId, nodeId, and SHA256 hash of the S3 information (bucketName and key) This field will be the hashkey on the cns-v GSI which is being maintained for reference counting s3 keys before deleting the s3 content | AB12342387:ufhhabfhgbb_hhfgw:269f3eaf7447753f1be2bb834aaadb3f1e-982ae153f6d8d944a981a25aa270b7 |

According to various embodiments, the file version table in Table 1 above may be stored in file version table 110 of FIG. 1 and accessed by the cloud drive content versioning service module 116, storage service 112, CDP module 106, and/or customer preferences module 114 of the content management system 102. The file version table 110 may be a dynamic database (e.g., "DDB") that may also be coupled to the storage service 112, such that metadata may be updated to include storage information (e.g., "s3 information") such as a storage key (e.g., "s3 key") and/or a storage location (e.g., "bucketName") of where content and their specific versions are stored. As illustrated above, metadata in the file version table 110 can include a hash key which may be a concatenation of a customer identifier (e.g., "customerId") and a node identifier (e.g., "nodeId"). Other metadata can include other fields such as version, which may be represented as a range key, and indicates the content version of the content. Additionally, the file version table may include fields for a time when the version was created, an application that created the version of the content, content properties of the current version, list of asset identifiers associated with the node, child asset type information (e.g., specifying the type of asset such as live video or slow motion video), storage location (e.g., "s3 bucketName"), and/or various keys (e.g., "s3 key", hash key). In some embodiments, the file version table may include a cns field storing the concatenated customer identifier, node identifier, and a SHA256 hash of the storage information (e.g., storage key and bucket).

TABLE 2

Content Version cns-v GSI Table

| FieldName | Type | Description | Example Value |
|---|---|---|---|
| cns | Hash key | Stores the concatenated customerId, nodeId, and SHA256 hash of the s3 information (bucketName and key) | AB12342387:ufhhabfhgbb_hhfgw:269f3eaf7447753f1be2bb834aaadb3f1e982ae153f6d8d-944a981a25aa270b7 |
| v | Range key | Content version | 2 |

According to various embodiments, the content version table in Table 2 above may be implemented in the cloud drive content versioning service module 116 of FIG. 1 and may be accessible by the node service module 108, storage service 112, and/or the customer preferences module 114 of the content management system 102. In some embodiments, the cloud drive content versioning service module 116 may be directly accessible by customers using client computing devices 130A, 130B, and 130C. The content version table may be accessed by the storage service 112, such that metadata may be updated to include storage information, such as a storage key (e.g., "s3 key") and/or bucket (e.g., "bucketName") indicating a location of where content and their specific versions are stored. According to various embodiments, Table 2 may be much smaller than Table 1 because Table 2 stores only the relevant metadata, thus utilizing less storage and processing resources. As illustrated above, metadata in the content version table in Table 2 can include a cns field, which may be represented a hash key. The hash key may be a concatenation of a customer identifier (e.g., "customerId"), a node identifier (e.g., "nodeId"), and a SHA256 hash of the storage information (e.g., storage key and bucket). Other metadata can include other fields such as version, which may be represented as a range key, and indicates the content version of the content.

TABLE 3

Customer Preferences Table

| FieldName | Type | Description | Example Value |
|---|---|---|---|
| cid | Hash key | customerId | AB12342387 |
| lmt | Number | Stores the last modified date in ISO8601 format from when the customer preference was updated | 2007-03-01T13:00:00Z |
| rkg | Number | Used to check if customer has enabled a recognition feature on this content | 0 |
| cnm | String | Stores the name of the customer | John Doe |

TABLE 3-continued

Customer Preferences Table

| FieldName | Type | Description | Example Value |
|---|---|---|---|
| fvs | JSON | Stores the list of document types for which file versioning is currently supported along with the maximum number of documents to retain for each document type | (<br>"fvs": [<br>(<br>"docType":<br>"DOCUMENT",<br>"maxVersions": 10<br>),<br>(<br>"docType":<br>"PHOTOS",<br>"maxVersions": 5<br>)<br>]<br>) |

According to various embodiments, the customer preferences table in Table 3 above may be stored in the customer preferences module 114 of FIG. 1 and may be accessible by the storage service 112, the cloud drive content versioning service module 116, the node service module 108, and/or the file version table 110 of the content management system 102. The customer preferences table shown in Table 3 may also be accessible by the storage service 112 and/or the cloud drive content versioning service module 116, such that metadata may be updated to include cloud drive settings and preferences for identified customers based on their customer identifiers (e.g., "customerId"). As illustrated above, metadata in the customer preferences table in Table 3 can include a customer identifier (e.g., "customerId") represented by a hash key and/or the name of the customer (e.g., "cnm"). Other metadata can include other fields such as a last modified data and time indicating when the current version of the content was last edited (e.g., "lmt"). The metadata may also include a list of types of content the customer has enabled content versioning and a number of versions to retain for each type of content (e.g., "fvs"). For example, in the example values shown in Table 3, when the content is a "DOCUMENT" then the customer prefers to retain a maximum of up to ten versions, but when the content are "PHOTOS" then the customer prefers to retain a maximum of up to five versions.

By utilizing the tables above, such as the condensed content version table in Table 2, the content management system of according to various embodiments provide content versioning in a cloud computing environment that can be operated on an independent resource (/nodes/(id)/version) that can be scaled independently during operation. Furthermore, because the content management system may be separate from the cloud computing environment, the content versioning may be expanded and operated independently from the cloud computing environment in a manner that is easier to maintain and understand. Additionally, as indicated by comparing the file version table of Table 1 to the content version table of Table 2, the content version table of Table 2 is much smaller in storing the most relevant metadata, which reduces the storage and processing resources needed. As the amount of content and their versions increase, as well as the vast number of customers storing and managing content on the content management system, the content version table of Table 2 results in much faster lookups with much less memory compared to the file version table of Table 1.

In some embodiments, the content management system may provide a platform to customers manage their content stored on the cloud. This platform may in part by provided and implemented using an application programming interface (API) 104 in FIG. 1. As an illustrative example, an API to create a node for electronic content is presented below:

```
// Create a version for a node
POST/node/<id>/file/version
// Retrieve a specific version for the given node
GET/node/<id>/file/version/<versionID>
// List all the versions for a given node
GET/node/<id>/file/versions
// Delete a specific version for the given node
DELETE/node/<id>/file/version/<versionID>
// File Version Data Model
(
    "customerId": "AB12342387",
    "nodeId": "ufhhabfhgbb_hhfgw",
    "name": "Name.doc",
    "version": 2,
    "lastModifiedBy": "CloudDriveWeb",
    "createdDate": "2017-03-07T22:00:00Z",
    "modifiedDate": "2017-04-07T22:00:00Z",
    "contentProperties": (
    "extension": "docx",
        "size": 13219,
        "contentType":
"application/vnd.openxmlformats-officedocument.word-
processingml.document",
        "version": 2,
        "md5": "a93c1d1424e2486911871d62d92c20db")
"s3Key":
"21GRZH0F7G180TGZE0LHDKLLMPLPTKR5JRZBI0
MASPKDODP7YA",
"s3Bucket": "cd-na-prod-content"
)
```

Figure 2:
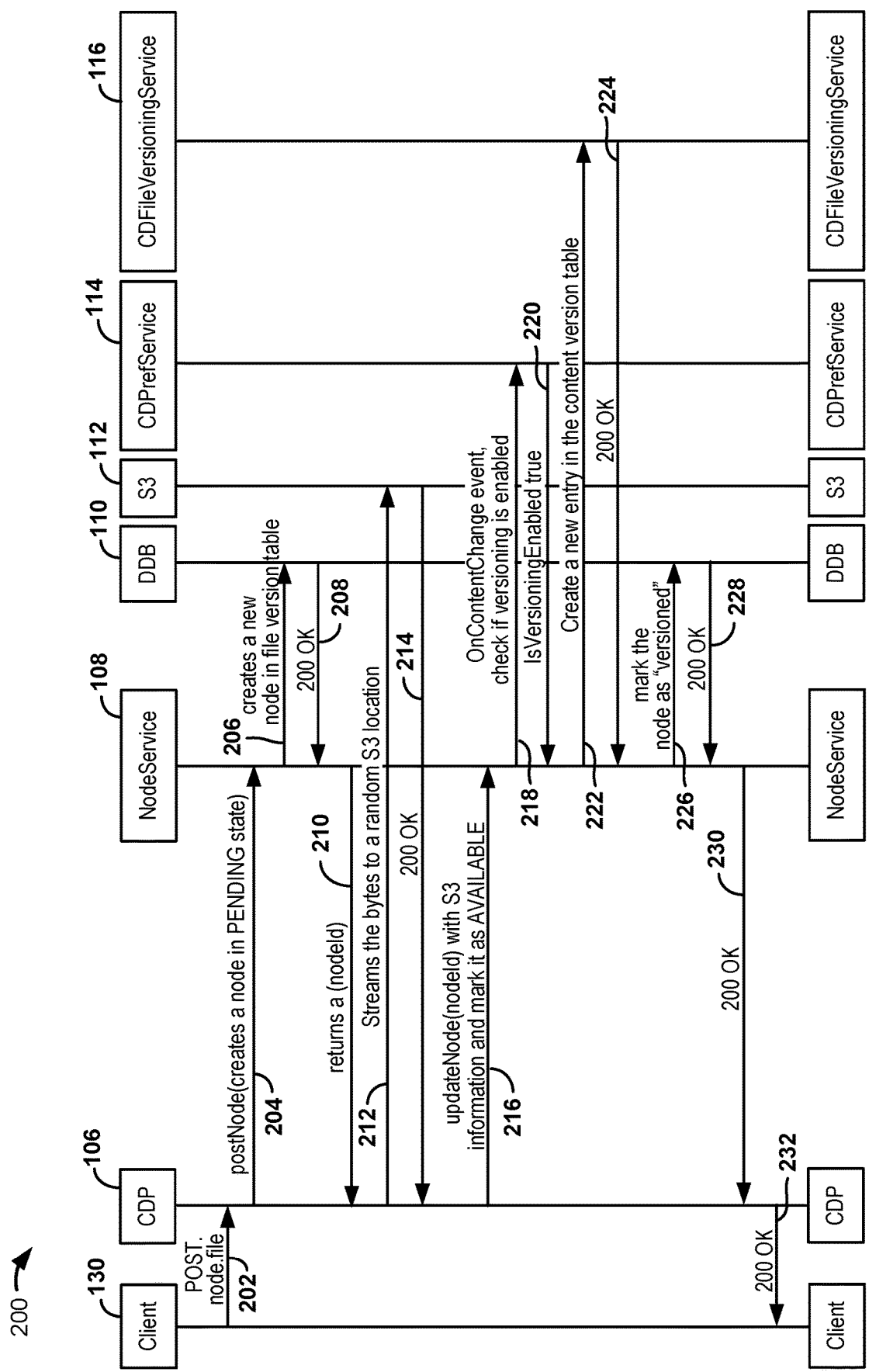
FIG. 2 illustrates an example method of uploading content in accordance with one embodiment.

FIG. 2 illustrates an example method 200 of uploading content according to various embodiments of the present invention. At 202, a customer may be operating a client computing device 130 and transmit a request to upload content. The request may include a command to upload a specific piece of content, for example "POST.node file" to upload a node (e.g., electronic content) in a file (e.g., digital format). The request may be received by the CDP module 106. At 204, the CDP may create a pending node based on the node in the request. For example, the CDP may transmit a command to the node service 108, as shown in the command "postNode" to create a node in a pending state. At 206, the node service 108 may then submit a request to create a new node in the file version table "DDB" 110, for example as shown in Table 1. At 208, the file version table 110 may return to the node service 108 confirmation that the request to create a new node in the file version table has been completed. For example, the file version table "DDB" 110 may transmit the hypertext transmission protocol (HTTP) code "200 OK" indicating that the request was successful and has been completed.

At 210, the node service 108, after receiving confirmation from the DDB 110, may identifying and return a node identifier to the CDP module 106. The node identifier may be extrapolated from the new node created in the file version table 110 based on a lookup of the customer and/or other information in the request, for example. At 212, the CDP module 106 may then initiate transmitting the node (e.g., electronic content) to the storage service "S3" 112. In some embodiments, the bytes of the node may be streamed to a random storage location in the storage service 112. At 214, the storage service 112 may respond with confirmation to the CDP module 106 that the streaming of the node has been completed (e.g., transmit a "200 OK" status code back to indicate that the request has been completed). At 216, the CDP may then update the node identifier associated with the node to include the storage service information, such as a storage key (e.g., "s3 key") and/or location (e.g., storage bucket). The node may also be marked as "AVAILABLE" in the update request, which is transmitted from the CDP module 106 to the node service module 108. At 218, the node service 108 may then transmit a request to the customer preference service (e.g., cloud drive preference service "CDPrefService") 114, in which the request includes a detecting that content has changed on the node and to look up in the customer preference table, for example as shown in Table 3, to determine whether for the node that customer has enabled content versioning. When a customer has enabled content versioning for the node, then the node is enabled to support multiple versions based on the metadata associated with the customer in the customer preference table (e.g., Table 3) in the customer preference service module 114. The request may include, as an example, a command to detect a change in the content, such as "OnContentChange" to trigger checking whether content versioning is enabled for the node for this customer.

At 220, when the customer preference service module 114 has determined the content versioning is enabled (e.g., "IsVersioningEnabled=true"), the customer preference service module 114 may transmit a response to the node service 108 to confirm that content versioning is enabled. At 222, the node service module 108 may then transmit a request to the cloud drive content versioning service (e.g., "CDFileVersioningService") 116 to create a new entry in the content version table, for example, as shown in Table 2. At 224, the cloud drive content versioning service 116 may transmit to the node service 108 that the request was successful (e.g., "200 OK") to confirm that a new entry was created in the content version table (e.g., Table 2). At 226, the node service 108 may then communicate with the file version table "DDB" 110 to mark the node as versioned, which may be performed by changing the metadata (e.g., altering a field) in the file version table 110 (e.g., Table 1). At 228, the file version table 110 may confirm that the node is marked as versioned with a message that the request was successful (e.g., "200 OK") that is sent to the node service 108. At 230, the confirmation that the request was successful may be forwarded from the node service 108 to the CDP module 106, and at 232, the confirmation may be forwarded to the client computing device 130.

Figure 3:
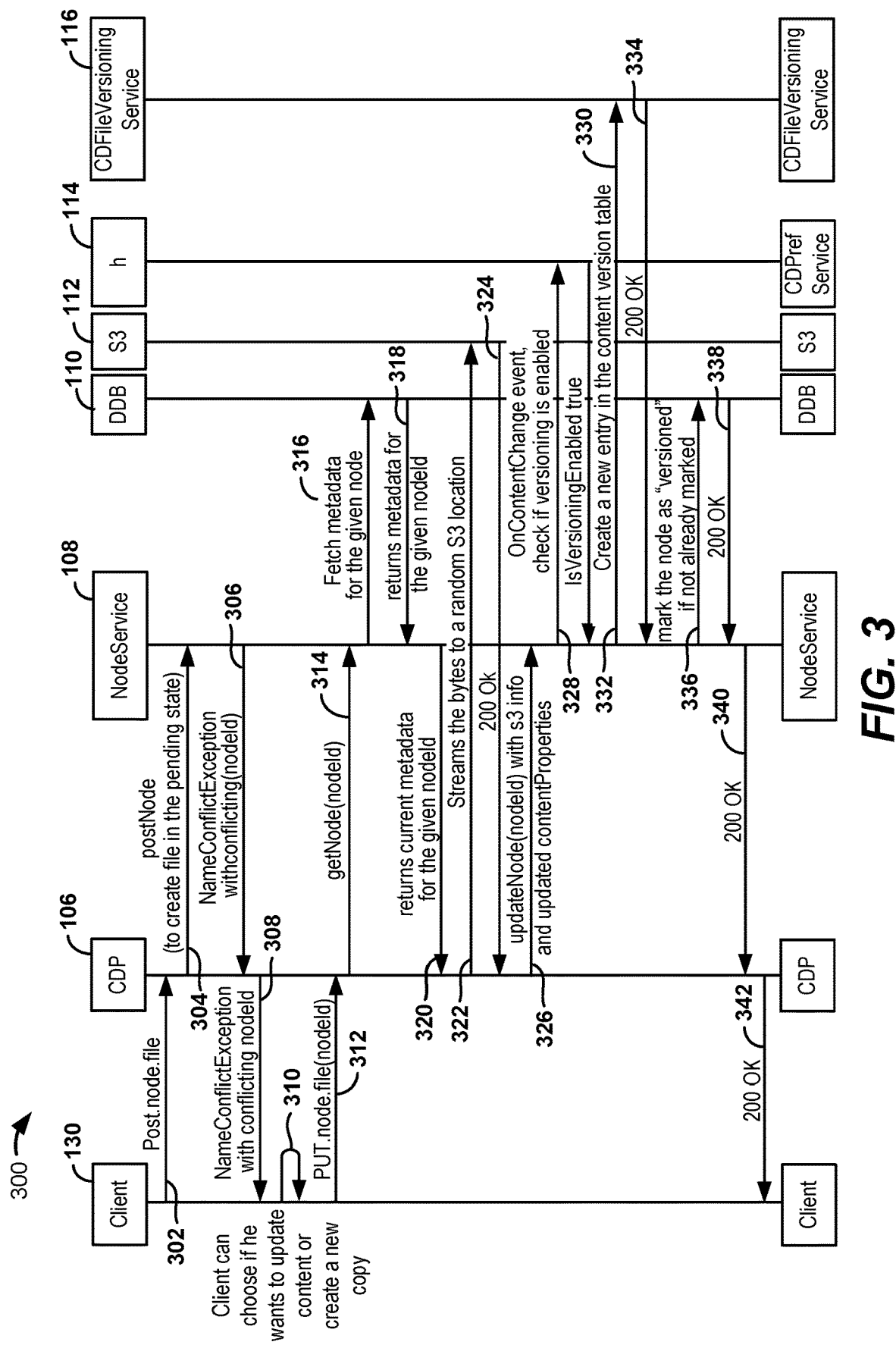
FIG. 3 illustrates an example method of uploading content with the same name in accordance with one embodiment.

FIG. 3 illustrates an example method 300 of uploading content with the same name to the same location. At 302, a customer may be operating a client computing device 130 and transmit a request to upload content having the same file name at a specific location. The request may include a command to upload a specific piece of content with a specific file name, for example "POST.node file" to upload a node (e.g., electronic content) in a file (e.g., digital format) with a file name. The request may be received by the CDP module 106. At 304, the CDP may create a pending node based on the node in the request. For example, the CDP may transmit a command to the node service 108, as shown in the command "postNode" to create a node in a pending state. At 306, the node service 108 may then return a response to the CD module 106 that a file name conflict has been detected with the associated node identifier, for example, the node service 108 may return a message "NameConflictExceptionwithconflictingnodeId") to the CDP module 106. In some embodiments, the node identifier may be extrapolated from the file version table 110 based on a lookup of the customer and/or other information in the request, for example. At 308, the CDP module 106 may forward the name conflict message to the client 130. The "NameConflictException" may be thrown back to the client 130 to have the customer choose to either upload the content as a 'new file' or to 'update the content for the existing nodeId.' Updating the content may initiate a versioning workflow, and if versioning is enabled, may initiate creating a new version for the file.

At 310, the client computing device 130 may prompt the customer to notify the customer of the name conflict and provide options such that the customer can select whether to update the content or to create a new copy. At 312, the client device 130 may transmit the selection to the CDP module 106, for example in this case, to update the content, which may include a command message "PUT.node file(nodeId)." At 314, the CDP module 106 may retrieve the node and node identifier from the node service 108, for example with a command message "getNode(nodeId)." Subsequently the node service 108 may then fetch metadata for the given node based on the node identifier at 316. The node service 108 may transmit this request for metadata to the file version table 110, and the metadata may be fetched based on a lookup of the node identifier, for example. At 318, the file version table 110 then returns the metadata for the given node identifier to the node service 108.

The current metadata may be forwarded from the node service 108 to the CDP module 106 at 320. At 322, the CDP module 106 may then initiate transmitting the node (e.g., electronic content) to the storage service "S3" 112. In some embodiments, the bytes of the node may be streamed to a random storage location in the storage service 112. At 324, the storage service 112 may respond with confirmation to the CDP module 106 that the streaming of the node has been completed (e.g., transmit a "200 OK" status code back to indicate that the request has been completed). At 326, the CDP may then update the node identifier associated with the node to include the storage service information, such as a storage key (e.g., "s3 key") and/or location (e.g., storage bucket). The node may also be updated with content properties, which is transmitted from the CDP module 106 to the node service module 108. At 328, the node service 108 may then transmit a request to the customer preference service (e.g., cloud drive preference service "CDPrefService") 114, in which the request includes a detecting that content has changed on the node and to look up in the customer preference table, for example as shown in Table 3, to determine whether for the node that customer has enabled content versioning. When a customer has enabled content versioning for the node, then the node is enabled to support multiple versions based on the metadata associated with the customer in the customer preference table (e.g., Table 3) in the customer preference service module 114. The request may include, as an example, a command to detect a change in the content, such as "OnContentChange" to trigger checking whether content versioning is enabled for the node for this customer.

At 330, when the customer preference service module 114 has determined the content versioning is enabled (e.g., "IsVersioningEnabled=true"), the customer preference service module 114 may transmit a response to the node service 108 to confirm that content versioning is enabled. At 332, the node service module 108 may then transmit a request to the cloud drive content versioning service (e.g., "CDFileVersioningService") 116 to create a new entry in the content version table, for example, as shown in Table 2. At 334, the cloud drive content versioning service 116 may transmit to the node service 108 that the request was successful (e.g., "200 OK") to confirm that a new entry was created in the content version table (e.g., Table 2). At 336, the node service 108 may then communicate with the file version table "DDB" 110 to mark the node as versioned, if the node is not already marked as versioned, which may be performed by changing the metadata (e.g., altering a field) in the file version table 110 (e.g., Table 1). At 338, the file version table 110 may confirm that the node is marked as versioned with a message that the request was successful (e.g., "200 OK") that is sent to the node service 108. At 340, the confirmation that the request was successful may be forwarded from the node service 108 to the CDP module 106, and at 342, the confirmation may be forwarded to the client computing device 130.

Figure 4:
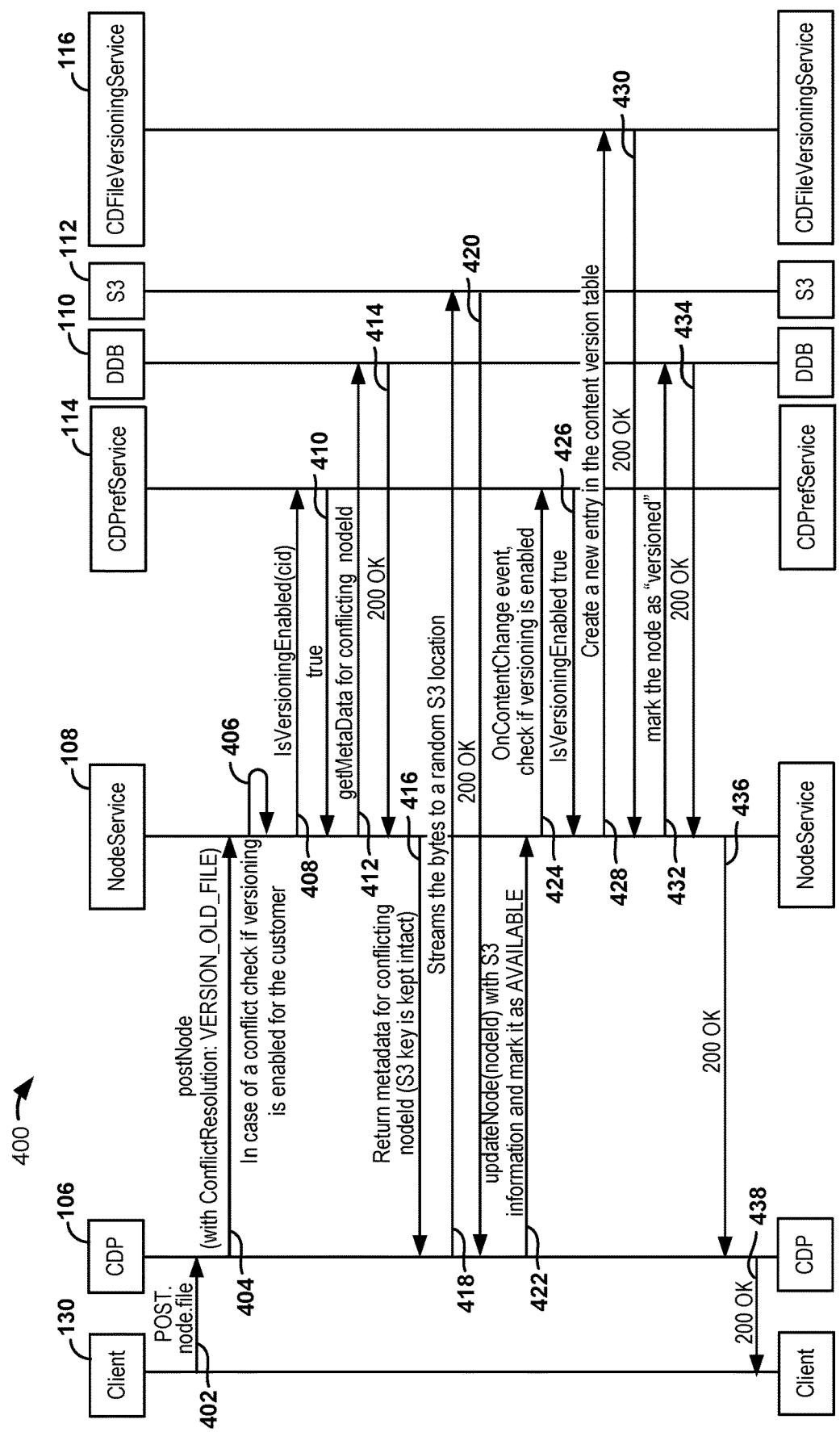
FIG. 4 illustrates another example method of uploading content with the same name in accordance with one embodiment.

FIG. 4 illustrates another example method 400 of uploading content with the same name to the same location. Alternative to the method 300 in FIG. 3, the method 400 does not prompt the customer for a selection to update the content or create a new copy. At 402, a customer may be operating a client computing device 130 and transmit a request to upload content having the same file name at a specific location. The request may include a command to upload a specific piece of content with a specific file name, for example "POST.node file" to upload a node (e.g., electronic content) in a file (e.g., digital format) with a file name. The request may be received by the CDP module 106. At 404, the CDP may detect a naming conflict with an older version of the node and transmit a request to the node service 108 to create a node with a resolution to the naming conflict with the older version (e.g., "postNode(with ConflictResolution: VERSION_OLD_FILE"). At 406, the node service 108 may check to determine whether versioning is enabled for the customer in the case of a naming conflict. In this embodiment, a new option is exposed for handling name conflicts 'VERSION_OLD_FILE and may create a new version for the conflicting node identifier (e.g., nodeId). Subsequently, at 408, the node service 108 may query the customer preference service 114 to determine whether versioning is enabled, for example with a command "isVersioningEnabled(cid)."

At 410, the customer preference service 114 may return that versioning is enabled by returning a "true" response to the query. The node service 108 may then request, at 412, metadata associated with the conflicting node identifier. The request "getMetadata" for the conflicting node identifier may be sent to the file version table 110. At 414, the file version table 110 may return a response to the node service that the request for metadata is complete and successful with the message "200 OK," for example. At 416, the node service 108 may then return the metadata for the conflicting node identifier to the CDP module 106. In some embodiments, the storage key may be kept intact despite the naming conflict.

At 418, the CDP module 106 may then initiate transmitting the node (e.g., electronic content) to the storage service "S3" 112. In some embodiments, the bytes of the node may be streamed to a random storage location in the storage service 112. At 420, the storage service 112 may respond with confirmation to the CDP module 106 that the streaming of the node has been completed (e.g., transmit a "200 OK" status code back to indicate that the request has been completed). At 422, the CDP may then update the node identifier associated with the node to include the storage service information, such as a storage key (e.g., "s3 key") and/or location (e.g., storage bucket). The node may also be marked as "AVAILABLE," which is transmitted from the CDP module 106 to the node service module 108. At 424, the node service 108 may then transmit a request to the customer preference service (e.g., cloud drive preference service "CDPrefService") 114, in which the request includes a detecting that content has changed on the node and to look up in the customer preference table, for example as shown in Table 3, to determine whether for the node that customer has enabled content versioning. When a customer has enabled content versioning for the node, then the node is enabled to support multiple versions based on the metadata associated with the customer in the customer preference table (e.g., Table 3) in the customer preference service module 114. The request may include, as an example, a command to detect a change in the content, such as "OnContentChange" to trigger checking whether content versioning is enabled for the node for this customer.

At 426, when the customer preference service module 114 has determined the content versioning is enabled (e.g., "IsVersioningEnabled=true"), the customer preference service module 114 may transmit a response to the node service 108 to confirm that content versioning is enabled. At 428, the node service module 108 may then transmit a request to the cloud drive content versioning service (e.g, "CDFileVersioningService") 116 to create a new entry in the content version table, for example, as shown in Table 2. At 430, the cloud drive content versioning service 116 may transmit to the node service 108 that the request was successful (e.g., "200 OK") to confirm that a new entry was created in the content version table (e.g., Table 2). At 432, the node service 108 may then communicate with the file version table "DDB" 110 to mark the node as versioned, if the node is not already marked as versioned, which may be performed by changing the metadata (e.g., altering a field) in the file version table 110 (e.g., Table 1). At 434, the file version table 110 may confirm that the node is marked as versioned with a message that the request was successful (e.g., "200 OK") that is sent to the node service 108. At 436, the confirmation that the request was successful may be forwarded from the node service 108 to the CDP module 106, and at 438, the confirmation may be forwarded to the client computing device 130.

However, when uploading a new node with conflict resolution as VERSION_OLD_FILE, content management system may create a new version for the conflicting node identifier (e.g., nodeId). As such, the node service 108 may return the metadata for the conflicting node identifier when the CDP module 106 first calls node service 108 to create the node in PENDING state, and the storage key (e.g., s3 key) and bucket may not be overridden until the CDP module 106 is done uploading content to the new storage location 112 to serve any download requests in the interim. Furthermore, the content management system according to various embodiments ensures prevention of accidental deletions of content at the storage location 112 for the conflicting nodeId in case the upload fails at 418. As such, the "conflictResolutionFlag: VERSION_OLD_FILES" may be implemented to achieve the method 300 in FIG. 3 and method 400 in FIG. 4.

Figure 5:
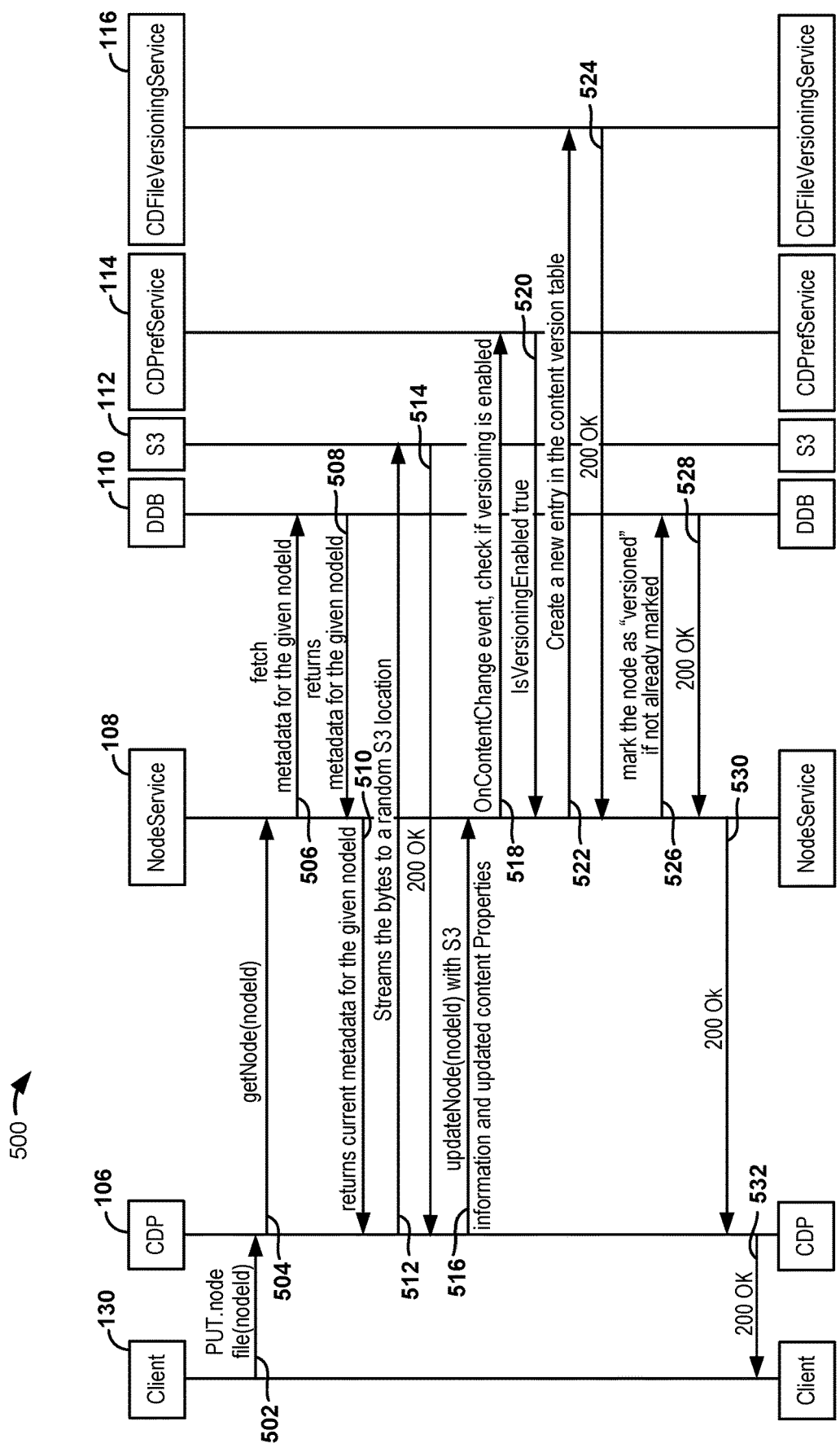
FIG. 5 illustrates an example method of updating content in accordance with one embodiment.

FIG. 5 illustrates an example method 500 of updating content according to various embodiments. At 502, a customer may be operating a client computing device 130 and transmit a request to update content. The request may include a command to update a specific piece of content, for example "PUT.node file" to update a node (e.g., electronic content) in a file (e.g., digital format). The request may be received by the CDP module 106. At 504, the CDP may request the node and node identifier. For example, the CDP may transmit a command to the node service 108, as shown in the command "getNode(nodeId)" to retrieve the node identifier associated with the content and/or customer. At 506, the node service 108 may then submit a request to fetch metadata for the given node in the file version table "DDB" 110, for example as shown in Table 1. At 508, the file version table 110 may return to the node service 108 the current metadata for the given node identifier, and at 510, the current metadata may be forwarded to the CDP module 106.

At 512, the CDP module 106 may then initiate transmitting the node (e.g., electronic content) to the storage service "S3" 112. In some embodiments, the bytes of the node may be streamed to a random storage location in the storage service 112. At 514, the storage service 112 may respond with confirmation to the CDP module 106 that the streaming of the node has been completed (e.g., transmit a "200 OK" status code back to indicate that the request has been completed). At 516, the CDP may then update the node identifier associated with the node to include the storage service information, such as a storage key (e.g., "s3 key") and/or location (e.g., storage bucket). The node may also include updated content properties in the update request, which is transmitted from the CDP module 106 to the node service module 108. At 518, the node service 108 may then transmit a request to the customer preference service (e.g., cloud drive preference service "CDPrefService") 114, in which the request includes a detecting that content has changed on the node and to look up in the customer preference table, for example as shown in Table 3, to determine whether for the node that customer has enabled content versioning. When a customer has enabled content versioning for the node, then the node is enabled to support multiple versions based on the metadata associated with the customer in the customer preference table (e.g., Table 3) in the customer preference service module 114. The request may include, as an example, a command to detect a change in the content, such as "OnContentChange" to trigger checking whether content versioning is enabled for the node for this customer.

At 520, when the customer preference service module 114 has determined the content versioning is enabled (e.g., "IsVersioningEnabled=true"), the customer preference service module 114 may transmit a response to the node service 108 to confirm that content versioning is enabled. At 522, the node service module 108 may then transmit a request to the cloud drive content versioning service (e.g, "CDFileVersioningService") 116 to create a new entry in the content version table, for example, as shown in Table 2. At 524, the cloud drive content versioning service 116 may transmit to the node service 108 that the request was successful (e.g., "200 OK") to confirm that a new entry was created in the content version table (e.g., Table 2). At 526, the node service 108 may then communicate with the file version table "DDB" 110 to mark the node as versioned, if the node is not already marked as versioned, which may be performed by checking and/or changing the metadata (e.g., altering a field) in the file version table 110 (e.g., Table 1). At 528, the file version table 110 may confirm that the node is marked as versioned with a message that the request was successful (e.g., "200 OK") that is sent to the node service 108. At 530, the confirmation that the request was successful may be forwarded from the node service 108 to the CDP module 106, and at 532, the confirmation may be forwarded to the client computing device 130.

Figure 6:
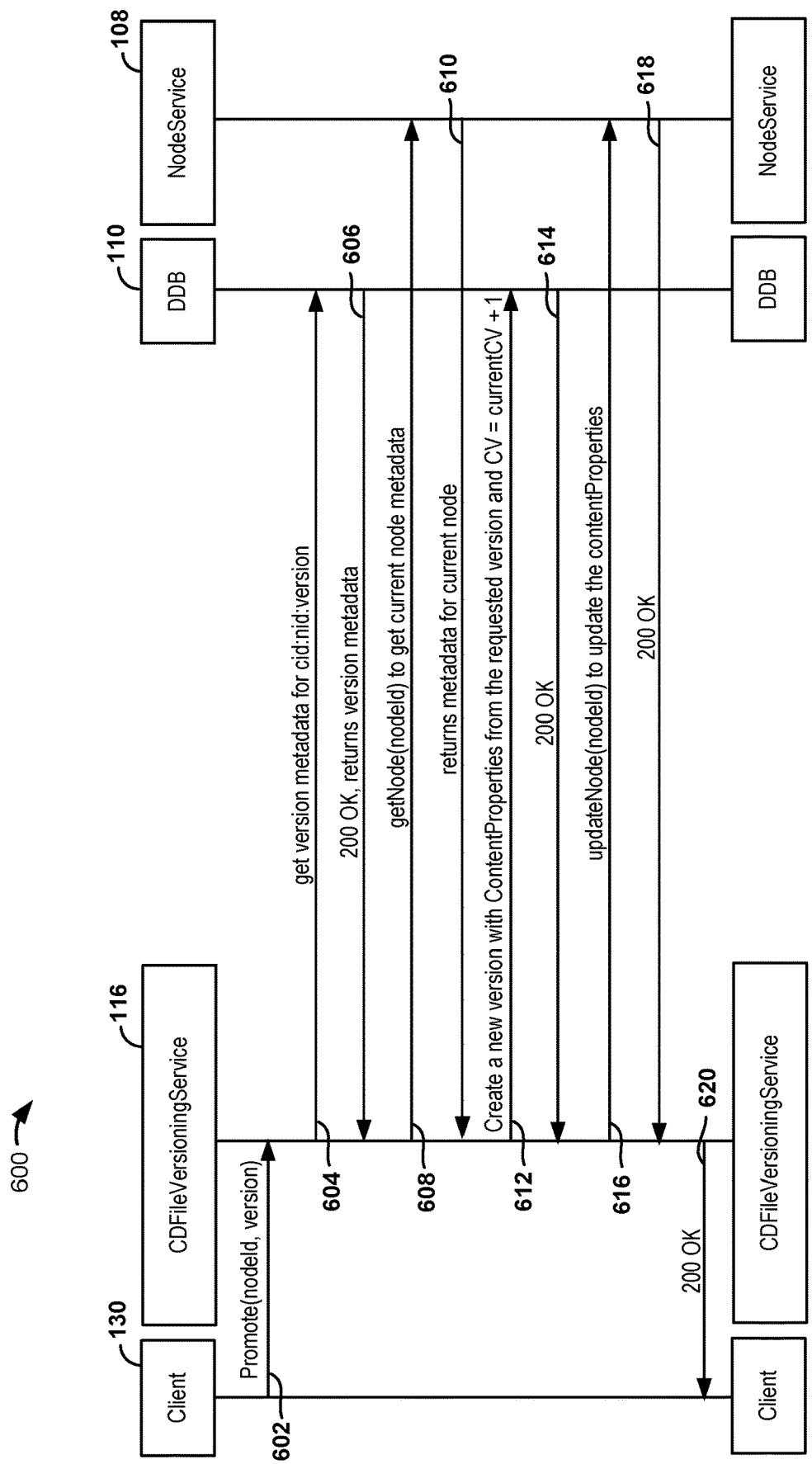
FIG. 6 illustrates an example method of promoting versions of content in accordance with one embodiment.

FIG. 6 illustrates an example method 600 of promoting a version of content according to various embodiments. At 602, the client may transmit a request to promote a version of content as the current version to the cloud drive content versioning service 116. The request may include a command, for example, "promote(nodeId, version)" to promote a specific version of the node identified by the mode identifier as the current version. At 604, the cloud drive content versioning service 116 may transmit a request to the file version table 110 to retrieve the metadata associated with the customer identifier, node identifier, and version of the content from the request. The file version table 110 may then, at 606, transmit a response back to the cloud drive content versioning service that the request is successful and complete, for example with a message "200 OK" and may further include the version metadata. At 608, the cloud drive content versioning service 116 may then transmit a request to the node service 108 to retrieve the node identifier for the current node metadata. The request may include a command "getNode(nodeId)" as an example. At 610, the node service 108 may return the metadata for the current node back to the cloud drive content versioning service 116.

At 612, the cloud drive content versioning service 116 may then transmit a request to the file version table 110 to create a new version of the node with content properties from the requested version and update the requested version as the current version. In response, the file version table 110 may transmit confirmation that the request was successful at 614. The cloud drive content versioning service 116 may then, at 616, request the node service 108 to update the node, identified by the node identifier, to update the content properties. In response, at 618, the node service 108 may confirm that the request was successful with the HTTP code "200 OK," which may then be forwarded from the cloud drive content versioning service 116 to the client 130 at 620. In method 600 of promoting a version, the method 600 may monotonically update the version even if the customer chooses to promote an older version as the current version. Embodiments of the present invention, in promoting a version, also ensure that promoting a file does not create a new version for the file when updating content in the node service 108 since it can trigger the content update workflow responsible for creating a new version, for example in FIG. 5.

Figure 7:
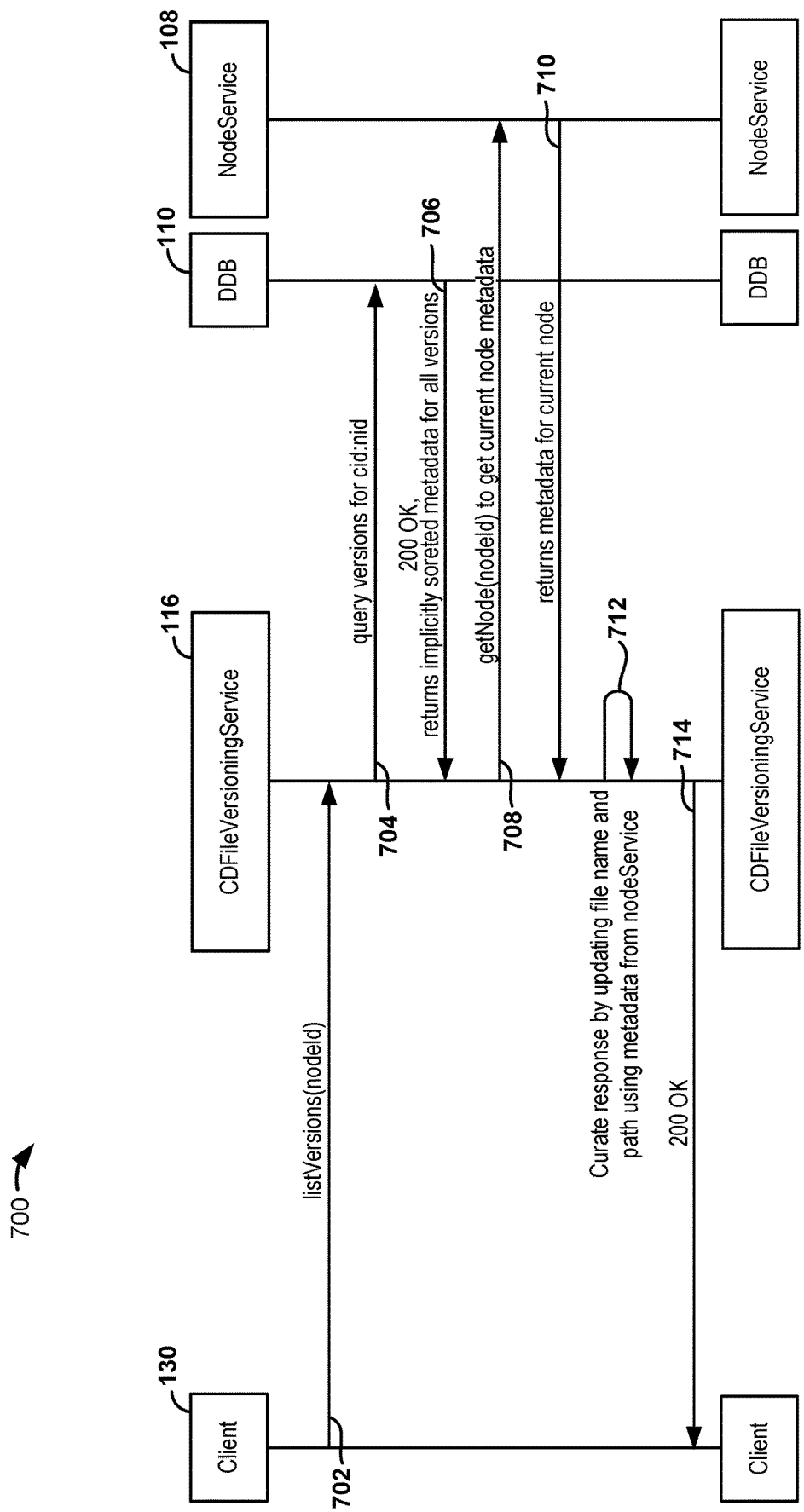
FIG. 7 illustrates an example method of listing versions of content in accordance with one embodiment.

FIG. 7 illustrates an example method 700 of listing versions of content according to various embodiments. At 702, the client may transmit a request to list the versions of content to the cloud drive content versioning service 116. The request may include a command referencing a node identifier, for example, "listVersions(nodeId)" to list the versions for a specific node identified by the node identifier. At 704, the cloud drive content versioning service 116 may transmit a request to the file version table 110 to query the version associated with the customer identifier and node identifier. The file version table 110 may then, at 706, transmit a response back to the cloud drive content versioning service 116 that the request is successful and complete, for example with a message "200 OK" and may further include the list of versions. In some embodiments, the list of versions may include implicitly sorted metadata for all versions of the content. At 708, the cloud drive content versioning service 116 may then transmit a request to the node service 108 to retrieve the node identifier for the current node metadata. The request may include a command "getNode(nodeId)" as an example. At 710, the node service 108 may return the metadata for the current node back to the cloud drive content versioning service 116.

At 712, the cloud drive content versioning service 116 may curate a response by updating a file name and path using metadata from the node service 108. In response, the cloud drive content versioning service 116 may then transmit confirmation that the request was successful to the client 130 at 714. The cloud drive content versioning service 116 may confirm that the request was successful with the HTTP code "200 OK" as an example.

Figure 8:
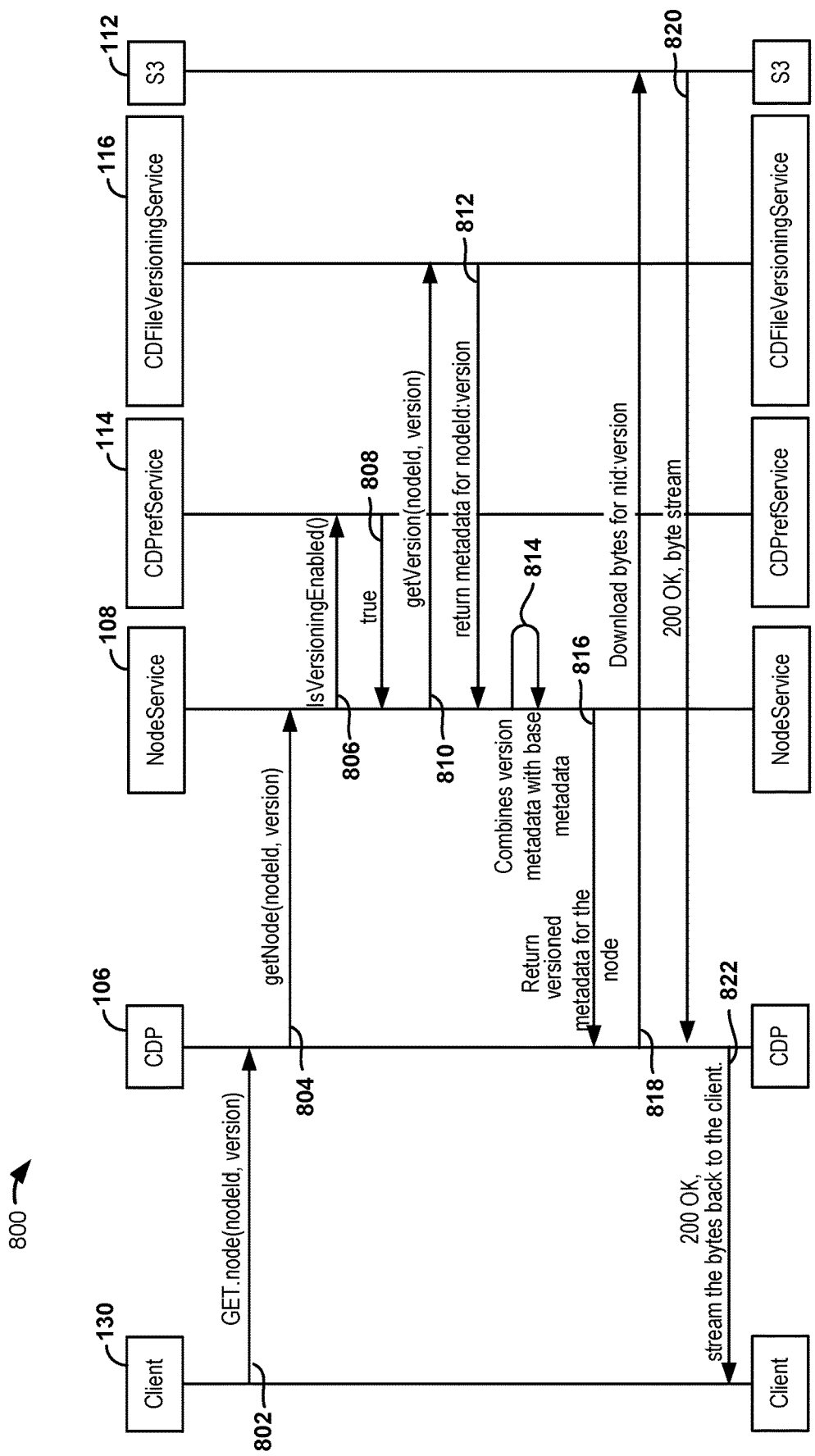
FIG. 8 illustrates an example method of downloading versions of content in accordance with one embodiment.

FIG. 8 illustrates an example method 800 of downloading a version of content according to various embodiments. At 802, the client may transmit a request to download a version of content, which may include transmitting a request to retrieve a node identifier and a version from the CDP module 106. The request may include a command, for example, "GET.node(nodeId, version)" to retrieve a specific version of the node identified by the mode identifier. At 804, the CDP module 106 may forward the request to the node service 108. The node service 108 may then, at 806, transmit a request to the customer preference service module 114 to query whether versioning is enabled for the requested content. The request may include a command, for example "IsVersioningEnabled( )" and at 808, the customer preference service module 114 may respond to the node service 108 that the versioning is enabled by returning "true." At 810, the node service 108 may transmit a request to the cloud drive content versioning service 116 to retrieve a specific version of the current node. The request may include a command "getVersion(nodeId, version)" as an example. At 812, the cloud drive content versioning service 116 may return the metadata for the version at the node identifier back to the node service 108.

At 814, the node service 108 may then combine the specified version metadata with base metadata. For example, the node service 108 may update a "getNode" API to return versioned metadata. In response, at 816, the node service 108 may return the combined metadata (i.e., versioned metadata being the combination of the specific version metadata with base metadata) for the node at the node identifier to the CDP module 106. At 818, the CDP module 106 may then initiate a download of the version of the node from the storage service 112. The download request may include the node identifier and other metadata to verify the version and storage location of the specified version. At 820, the storage service 112 may confirm to the CDP module 106 that the request was successful with the HTTP code "200 OK" with a byte stream of the specified version of the node, which may then be forwarded (e.g., "200 OK" and byte stream of the specified version of the node) from the CDP module 106 to the client 130 at 822.

Figure 9:
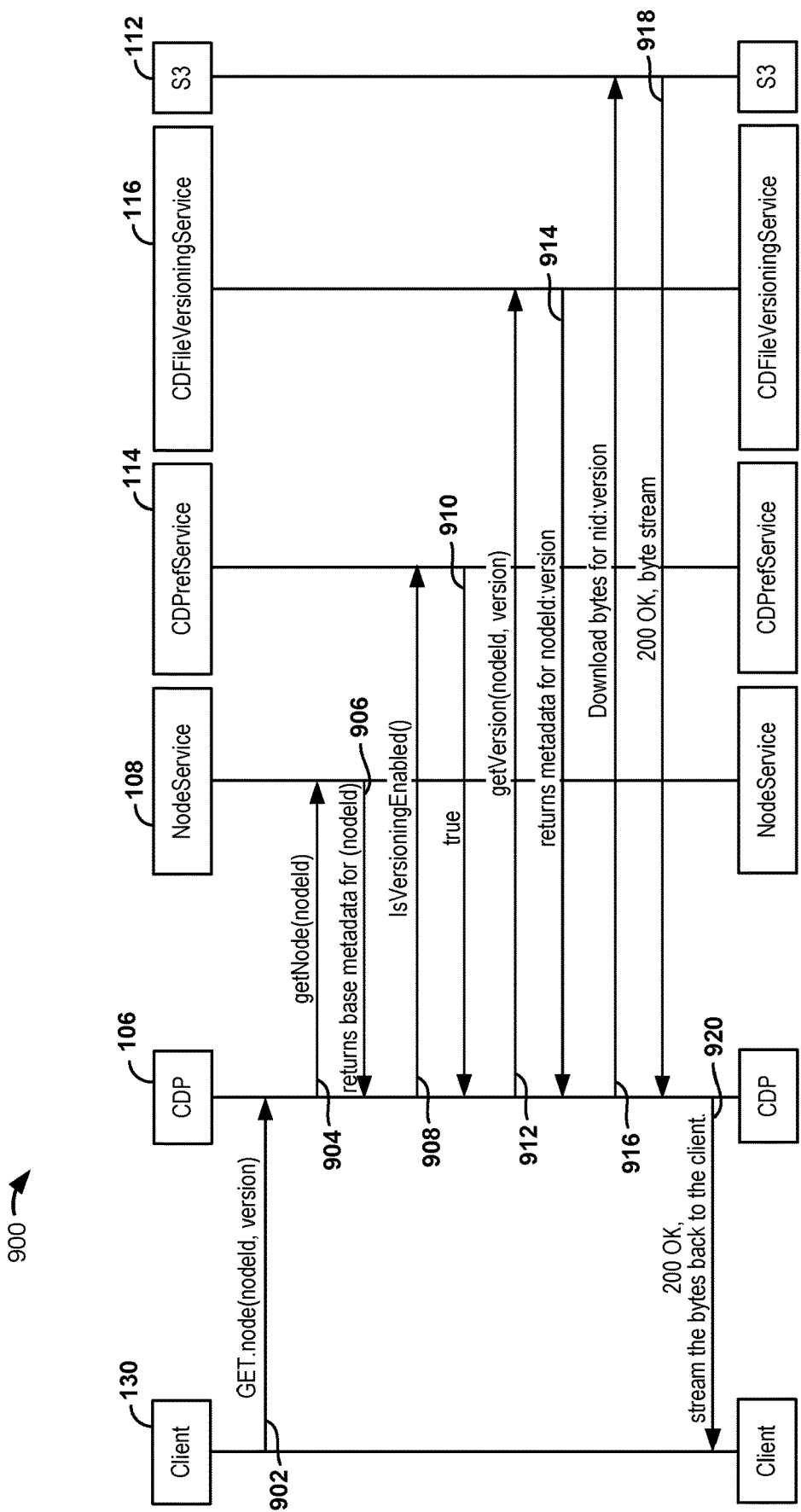
FIG. 9 illustrates another example method of downloading versions of content in accordance with one embodiment.

FIG. 9 illustrates another example method 900 of downloading a version of content according to various embodiments. Alternative to the method 800 in FIG. 7, the method 900 may curate the final metadata in the CDP module 106 by transmitting a "getNode(nodeId)" request to the node service 108. As a result, the CDP module 106 may then obtain base metadata for a node and transmit a "getVersion (nodeId)" request to retrieve content properties and storage information for the given version. At 902, the client may transmit a request to download a version of content, which may include transmitting a request to retrieve a node identifier and a version from the CDP module 106. The request may include a command, for example, "GET.node(nodeId, version)" to retrieve a specific version of the node identified by the mode identifier. In some embodiments, the CDP module 106 may modify the "GET.node" API to pass in the requested version as an header, and the CDP module 106 may return the current node if versioning is not enabled for the customer. At 904, the CDP module 106 may forward the request to the node service 108. The node service 108 may then, at 906, return base metadata for the node identifier to the CDP module 106. The CDP module may then, at 908, transmit a request to the customer preference service module 114 to query whether versioning is enabled for the requested content. The request may include a command, for example "IsVersioningEnabled( )" and at 910, the customer preference service module 114 may respond to the node service 108 that the versioning is enabled by returning "true." At 912, the node service 108 may transmit a request to the cloud drive content versioning service 116 to retrieve a specific version of the current node. The request may include a command "getVersion(nodeId, version)" as an example. At 914, the cloud drive content versioning service 116 may return the metadata for the version at the node identifier back to the node service 108.

At 916, the node service 108 may then initiate a download of the version of the node from the storage service 112. The download request may include the node identifier and other metadata to verify the version and storage location of the specified version. At 918, the storage service 112 may confirm to the CDP module 106 that the request was successful with the HTTP code "200 OK" with a byte stream of the specified version of the node, which may then be forwarded (e.g., "200 OK" and byte stream of the specified version of the node) from the CDP module 106 to the client 130 at 920.

Figure 10:
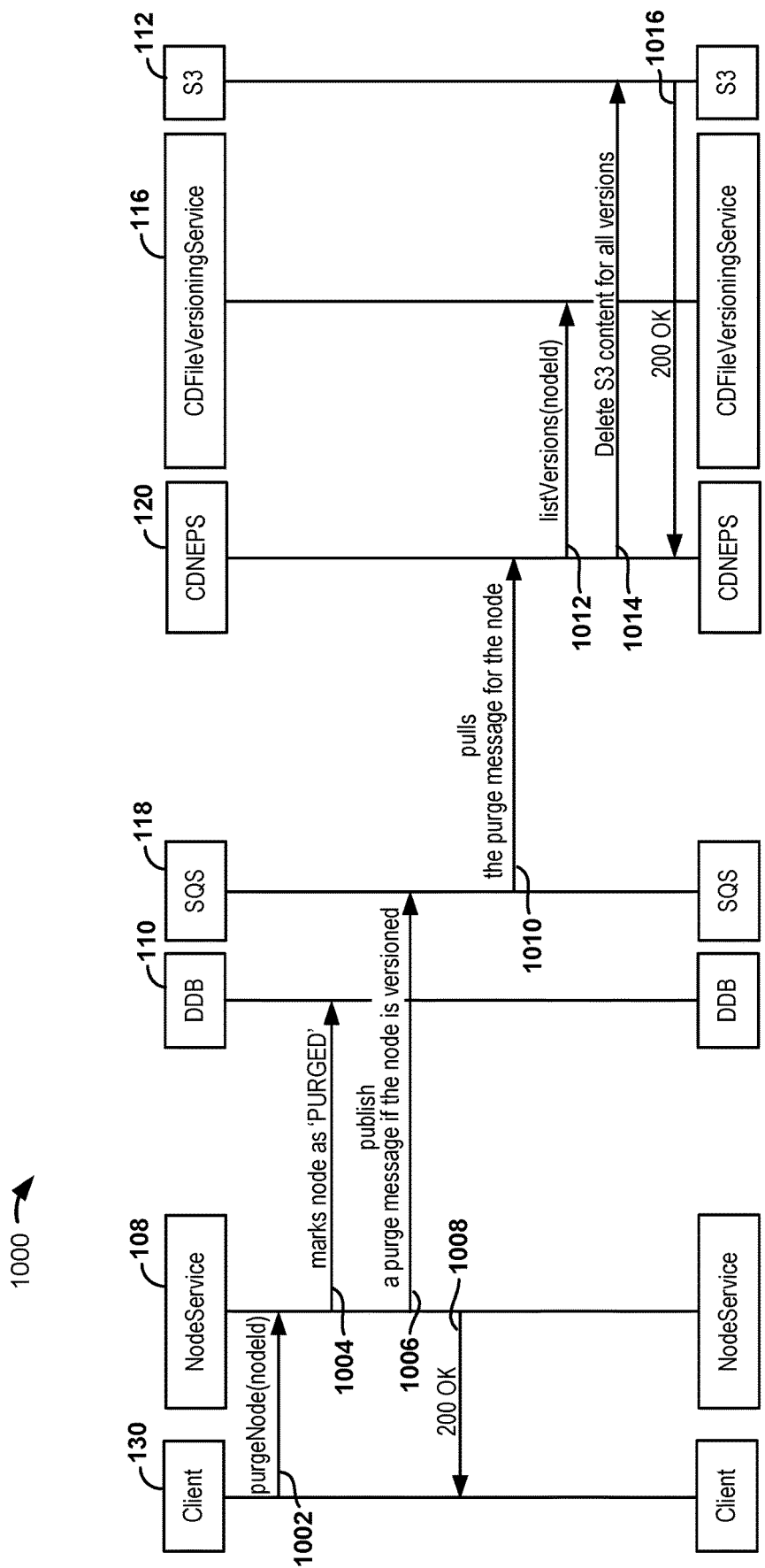
FIG. 10 illustrates an example method of purging nodes in accordance with one embodiment.

FIG. 10 illustrates an example method 1000 of purging versions of content according to various embodiments. According to one embodiment, purging a node with versions may trigger an asynchronous workflow to delete all the related versions. In another embodiment, the customer can purge a specific version of the node. At 1002, the client 130 may transmit a request to purge content. The request may be sent to the node service 108 and may include a command referencing a node identifier, for example, "purgeNode (nodeId)" to specify a node to purge. At 1004, the node service 108 may mark the node as 'PURGED" to the file version table 110. Simultaneously and/or subsequently, the node service may publish a purge message if the nose is versioned at 1006 by communicating with a queue service "SQS" 118. The node service 108 may then, at 1008, transmit a response back to the client device 130 that the request is successful and complete, for example with a message "200 OK" to indicate to the customer that the node has been purged. Simultaneously and/or subsequently, at 1010, the queue service 118 may transmit a request to a cloud drive node event processing service "CDNEPS" 120 to pull the purge message for the node identified by the node identifier. At 1012, the CDNEPS 120 may then transmit a request to the cloud drive content versioning service 116 to retrieve a list of versions associated with the node identifier. The request may include a command "listVersions(nodeId)" as an example.

Subsequently at 1014, the CDNEPS 120 may initiate deletion of the content for all versions at the storage service 112. In some embodiments, alternative to deleting all versions of the node, the CDNEPS 120 may query a specific version of the node for deletion. In response, the storage service 112 may then transmit confirmation that the request was successful to the CDNEPS 120 at 1016. The storage service 112 may confirm that the request was successful with the HTTP code "200 OK" as an example.

According to various embodiments, the content management system may support content versioning at the storage service 112, which may eliminate the need the explicitly maintain versions of different nodes. Versioning the storage service may involve a bucket level concept such that versioning may be enabled for all the objects in a bucket. Embodiments of the present invention also include enabling versioning based on the content type.

In another embodiment, the content management system may model versions as assets, such that the node service may maintain the version information. Any update to node metadata(e.g., rename/promote) on the parent node (e.g., master copy) may be replicated across child nodes (e.g., versioned copies). To avoid unnecessary write operations on the file version table or the content version table, which can lead to throttling issues, the content management system may implement a method that does not transmit the versioned nodes as part of the changes stream.

Other embodiments of the present invention include object tagging at the storage service 112 for storing reference counts, which enables the content version table to maintain reference counts. To handle moving and renaming a versioned file, the content management system of the present invention may support rename/move operations by updating base metadata stored on the content version table. The cloud drive content versioning service 116 may then query the content version table to curate the response being sent back to the clients.

Various embodiments may include using an MD5 algorithm as a hash function to produce a 128-bit hash value. To prevent or reduce MD5 deduplication if content is being updated for a node that was previously a master node for some MD5 value, the content management system may publish a message to a cloud drive asynchronous operation (e.g., "CDAsyncOperation") queue for every new version created (i.e., every time content is being updated). A queue poller may then trigger the workflow for electing a new master for the previous MD5.

Additionally, specific metadata and tags (e.g., image classification, location, etc.) may be updated when a customer is promoting a version or updating content for a version by publishing a node event (e.g, "nodeEvent") message to a cloud drive node event processing service 120 (e.g., "CloudDriveNodeEvents") queue every time a new version for a file is created. As a result, this may trigger the workflow for detecting new concepts and locations and updating our secondary indexes.

Embodiments of the present invention may also be configured and enabled to update the file version table (e.g., Table 1) and/or content version table (e.g., Table 2) asynchronously. For example, if content versioning is enabled for a customer, the versioning setting forms an integral part of the upload workflow. The content management system may refuse the upload if the content management system fails to create a version for the file in the content version table or file version table for the customer, as this can only be achieved if the content version table or file version table are updated synchronously. A synchronous workflow may provide not only simpler flow to understand and implement, but it may also provide consistency and service level agreement (SLA) guarantees to the clients.

According to various embodiments, asset information for each version may be stored in the content version table (e.g., Table 2) because the content management system may persist the asset information for each version to avoid doing the post processing during the promote workflow; for example, when a historical version is being promoted to the latest version. Post processing is an expensive operation, especially in case of video content and therefore, it may be advantageous for the content management system to avoid duplicating the effort by storing the assets related to the older versions, as these assets may be cleaned asynchronously as part of a purge workflow when a node gets deleted.

Figure 11:
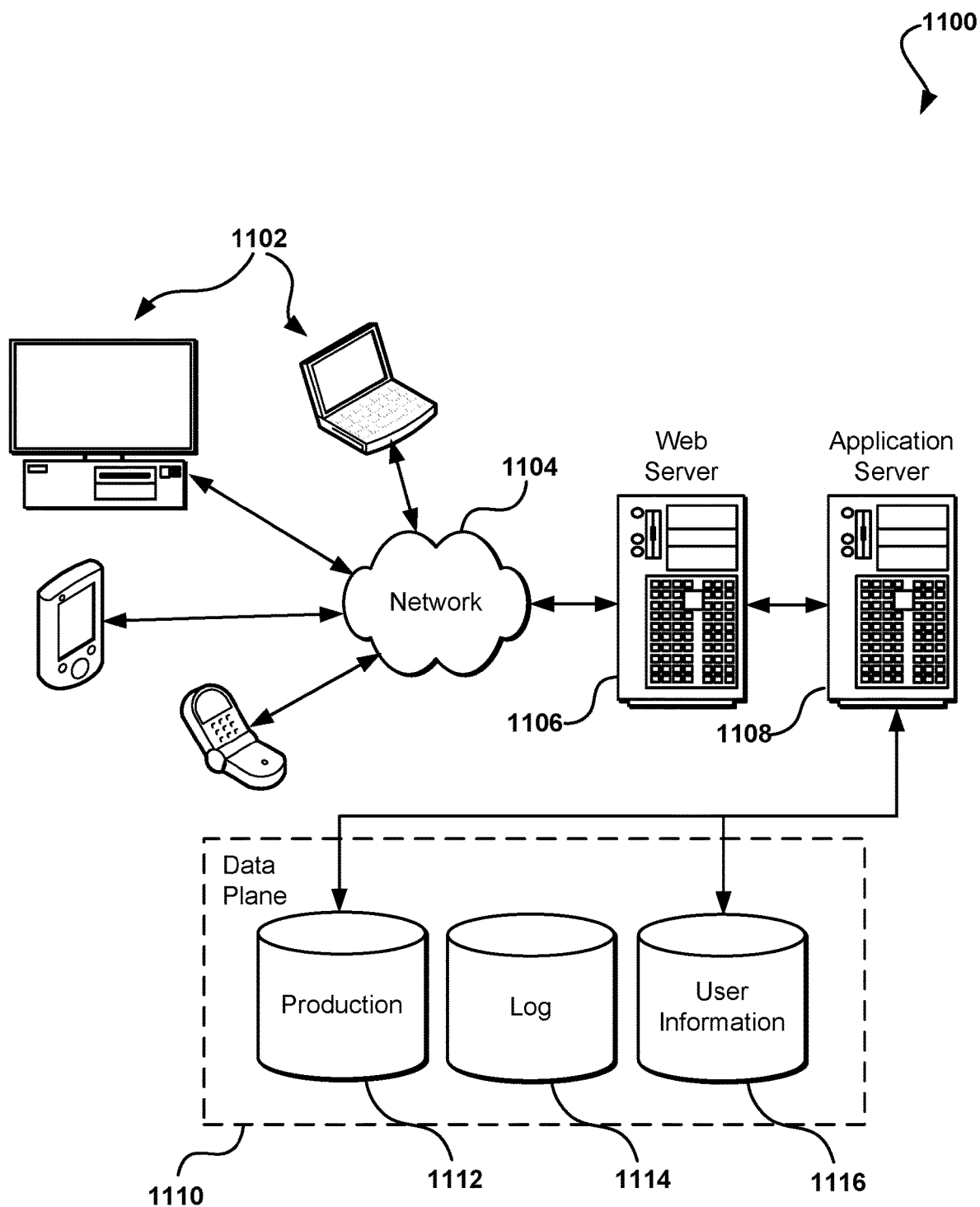
FIG. 11 illustrates an environment in which various embodiments can be implemented.

FIG. 11 illustrates an example of an environment 1100 for implementing aspects in accordance with various embodiments. As will be appreciated, although a Web-based environment is used for purposes of explanation, different environments may be used, as appropriate, to implement various embodiments. An electronic client device 1102 can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a plurality of resources, servers, hosts, instances, routers, switches, data stores, and/or other such components defining what will be referred to herein as a data plane 1140, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 1106, application server 1108 and similar components can be considered to be part of the data plane. The handling of all requests and responses, as well as the delivery of content between the client device 1102 and the application server 1108, can be handled by the Web server. It should be understood that the Web and application servers are not required and are merely example components, as structured code can be executed on any appropriate device or host machine as discussed elsewhere herein.

The data stores of the data plane 1140 can include several separate data tables, databases, or other data storage mechanisms and media for storing data relating to a particular aspect. For example, the data plane illustrated includes mechanisms for storing production data 1112 and user information 416, which can be used to serve content for the production side. The data plane also is shown to include a mechanism for storing log data 1114, which can be used for purposes such as reporting and analysis of the user data; including gathering and aggregating the large amounts of data from multiple users on the network. It should be understood that there can be many other aspects that may need to be stored in a data store, such as for page image information and access right information, which can be stored in any of the above listed mechanisms as appropriate or in additional mechanisms in the data plane 1140. The data plane 1140 is operable, through logic associated therewith, to receive instructions from the application server 1108 and obtain, update, or otherwise process data, instructions, or other such information in response thereto. In one example, a user might submit a search request for a certain type of item. In this case, components of the data plane might access the user information to verify the identity of the user, gather user information, and access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

An environment such as that illustrated in FIG. 11 can be useful for various content providers or other such entities, wherein multiple hosts and various types of resources might be used to perform tasks such as serving content, authenticating users, gathering user data and information, analyzing and aggregating user data, predicting user behavior, allocating resources, or performing any of a number of other such tasks. Some of these hosts may be configured to offer similar functionality, while other servers might be configured to perform at least some different functions.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for managing electronic content comprising:
    receiving a first request to upload a first version of electronic content, the electronic content transmitted by a first computing device coupled to the one or more computing systems via a network;
    creating a node of the first version of the electronic content, the node created in a file version table and including a customer identifier and a node identifier for the node from the first request;
    obtaining the first version of the electronic content to be stored at a first storage location;
    updating the node identifier to include the first storage location;
    detecting a change in the first version of the electronic content; and
    creating, in response to detecting the change, a first entry in a content version table, the first entry including the customer identifier concatenated with the node identifier and a first hash key, the first hash key computed based at least in part on the first storage location.

2. The computer-implemented method of claim 1, further comprising:
    receiving a second request to update the first version of the electronic content with a second version of the electronic content, the second request including the customer identifier;
    retrieving, from the file version table, metadata for the node based at least in part on the node identifier, the metadata including the customer identifier and the first hash key;
    obtaining the second version of the electronic content for storage at a second storage location;
    updating the node identifier to include the second storage location;
    determining that the second version of the electronic content is different from the first version of the electronic content; and
    creating a second entry in the content version table to include the customer identifier concatenated with the updated node identifier and a second hash key, the second hash key computed based at least in part on the second storage location.

3. The computer-implemented method of claim 2 wherein the second request is transmitted by a second computing device.

4. The computer-implemented method of claim 1, further comprising:
    receiving a third request to upload new electronic content to the system, the third request including the node identifier;
    determining a conflict between the first version of the electronic content and the new electronic content based at least in part on a new file identifier of the new electronic content and a file identifier of the first version of the electronic content;
    receiving a selection to update the first version of the electronic content with the new electronic content based at least in part on the new file identifier matching the file identifier of the first version of the electronic content;
    retrieving, from the file version table, metadata for the node based at least in part on the node identifier, the metadata including the customer identifier and the first hash key;
    obtaining the new version of the electronic content for storage at a third storage location;
    updating the node identifier to include the third storage location;
    verifying that the new electronic content is different from the first version of the electronic content; and
    creating a third entry in the content version table to include the customer identifier concatenated with the updated node identifier and a third hash key, the third hash key computed based at least in part on the third storage location.

5. The computer-implemented method of claim 1, further comprising:
    receiving a fourth request to retrieve a current version of the electronic content, the fourth request including the node identifier;
    retrieving, from the file version table, metadata for the node based at least in part on the node identifier, the metadata including the current version of the electronic content; and
    providing, in response to the fourth request, the current version of the electronic content.

6. The computer-implemented method of claim 1, further comprising:
receiving a fifth request to retrieve a list of versions of the electronic content, the fifth request including the node identifier;
retrieving, from the file version table, metadata for the node based at least in part on the node identifier, the metadata including the list of versions of the electronic content; and
providing, in response to the fifth request, the current version of the electronic content.

7. The computer-implemented method of claim 1, further comprising:
receiving a sixth request to download a current version of the electronic content;
retrieving, from the file version table, metadata for the node based at least in part on the node identifier, the metadata including the current version of the electronic content;
preparing, for download, the current version of the electronic content; and
providing, in response to the sixth request, the current version of the electronic content.

8. The computer-implemented method of claim 1, further comprising:
receiving a seventh request to purge the node, the seventh request including the node identifier for the node;
retrieving, from the file version table, metadata for the node based at least in part on the node identifier, the metadata including a list of versions of the electronic content and the hash key;
determining one or more storage locations of each version in the list of versions of the electronic content based at least in part on the hash key; and
deleting each version of the electronic content from the one or more storage locations.

9. The computer-implemented method of claim 1, further comprising:
determining whether the electronic content is enabled to be versioned.

10. A non-transitory computer-readable storage medium having stored therein instructions which, when executed by at least one computing device, cause the at least one computing device to perform a method comprising:
receive a first request to upload a first version of electronic content;
create a node of the first version of the electronic content, the node created in a file version table and including a customer identifier and a node identifier for the node from the first request;
obtain the first version of the electronic content to be stored at a first storage location;
update the node identifier to include the first storage location;
detect a change in the first version of the electronic content; and
create, in response to detecting the change, a first entry in a content version table, the first entry including the customer identifier concatenated with the node identifier and a first hash key, the first hash key computed based at least in part on the first storage location.

11. The non-transitory computer-readable storage medium of claim 10, wherein the instructions when executed further cause the at least one computing device to:
receive a second request to update the first version of the electronic content with a second version of the electronic content, the second request including the customer identifier;
retrieve, from the file version table, metadata for the node based at least in part on the node identifier, the metadata including the customer identifier and the first hash key;
obtain the second version of the electronic content for storage at a second storage location;
update the node identifier to include the second storage location;
determine that the second version of the electronic content is different from the first version of the electronic content; and
create a second entry in the content version table to include the customer identifier concatenated with the updated node identifier and a second hash key, the second hash key computed based at least in part on the second storage location.

12. The non-transitory computer-readable storage medium of claim 11, wherein the instructions when executed further cause the at least one computing device to:
receive a third request to upload new electronic content to the system, the third request including the node identifier;
determine a conflict between the first version of the electronic content and the new electronic content based at least in part on a new file identifier of the new electronic content and a file identifier of the first version of the electronic content;
receive a selection to update the first version of the electronic content with the new electronic content based at least in part on the new file identifier matching the file identifier of the first version of the electronic content;
retrieve, from the file version table, metadata for the node based at least in part on the node identifier, the metadata including the customer identifier and the first hash key;
obtain the new version of the electronic content for storage at a third storage location;
update the node identifier to include the third storage location;
verify that the new electronic content is different from the first version of the electronic content; and
create a third entry in the content version table to include the customer identifier concatenated with the updated node identifier and a third hash key, the third hash key computed based at least in part on the third storage location.

13. The non-transitory computer-readable storage medium of claim 11, wherein the instructions when executed further cause the at least one computing device to:
receive a fourth request to retrieve a current version of the electronic content, the fourth request including the node identifier;
retrieve, from the file version table, metadata for the node based at least in part on the node identifier, the metadata including the current version of the electronic content; and
provide, in response to the fourth request, the current version of the electronic content.

14. The non-transitory computer-readable storage medium of claim 11, wherein the instructions when executed further cause the at least one computing device to:
receive a sixth request to download a current version of the electronic content;

retrieve, from the file version table, metadata for the node based at least in part on the node identifier, the metadata including the current version of the electronic content;

prepare, for download, the current version of the electronic content; and provide, in response to the sixth request, the current version of the electronic content.

15. The non-transitory computer-readable storage medium of claim 11, wherein the instructions when executed further cause the at least one computing device to:

receive a seventh request to purge the node, the seventh request including the node identifier for the node;

retrieve, from the file version table, metadata for the node based at least in part on the node identifier, the metadata including a list of versions of the electronic content and the hash key;

determine one or more storage locations of each version in the list of versions of the electronic content based at least in part on the hash key; and delete each version of the electronic content from the one or more storage locations.

16. A system, comprising:

at least one processor; and memory including instructions that, when executed by the at least one processor, cause the system to:

receive a first request to upload a first version of electronic content;

create a node of the first version of the electronic content, the node created in a file version table and including a customer identifier and a node identifier for the node from the first request;

obtain the first version of the electronic content to be stored at a first storage location;

update the node identifier to include the first storage location;

detect a change in the first version of the electronic content; and create, in response to detecting the change, a first entry in a content version table, the first entry including the customer identifier concatenated with the node identifier and a first hash key, the first hash key computed based at least in part on the first storage location.

17. The system of claim 16, wherein the instructions when executed further cause the system to:

receive a second request to update the first version of the electronic content with a second version of the electronic content, the second request including the customer identifier;

retrieve, from the file version table, metadata for the node based at least in part on the node identifier, the metadata including the customer identifier and the first hash key;

obtain the second version of the electronic content for storage at a second storage location;

update the node identifier to include the second storage location;

determine that the second version of the electronic content is different from the first version of the electronic content; and create a second entry in the content version table to include the customer identifier concatenated with the updated node identifier and a second hash key, the second hash key computed based at least in part on the second storage location.

18. The system of claim 17, wherein the instructions when executed further cause the system to:

receive a third request to upload new electronic content to the system, the third request including the node identifier;

determine a conflict between the first version of the electronic content and the new electronic content based at least in part on a new file identifier of the new electronic content and a file identifier of the first version of the electronic content;

receive a selection to update the first version of the electronic content with the new electronic content based at least in part on the new file identifier matching the file identifier of the first version of the electronic content;

retrieve, from the file version table, metadata for the node based at least in part on the node identifier, the metadata including the customer identifier and the first hash key;

obtain the new version of the electronic content for storage at a third storage location;

update the node identifier to include the third storage location;

verify that the new electronic content is different from the first version of the electronic content; and create a third entry in the content version table to include the customer identifier concatenated with the updated node identifier and a third hash key, the third hash key computed based at least in part on the third storage location.

19. The system of claim 17, wherein the instructions when executed further cause the system to:

receive a fourth request to retrieve a current version of the electronic content, the fourth request including the node identifier;

retrieve, from the file version table, metadata for the node based at least in part on the node identifier, the metadata including the current version of the electronic content; and provide, in response to the fourth request, the current version of the electronic content.

20. The system of claim 17, wherein the instructions when executed further cause the system to:

receive a fifth request to download a current version of the electronic content;

retrieve, from the file version table, metadata for the node based at least in part on the node identifier, the metadata including the current version of the electronic content;

prepare, for download, the current version of the electronic content; and provide, in response to the fifth request, the current version of the electronic content.

\* \* \* \* \*